United States Patent [19]
Mitchell et al.

[11] Patent Number: 5,493,928
[45] Date of Patent: Feb. 27, 1996

[54] TRANSMISSION CONTROL DEFAULT OPERATION

[75] Inventors: Randall M. Mitchell, Washington; Ashok Kajjam; Alan L. Stahl, both of Peoria, all of Ill.

[73] Assignee: Caterpillar Inc., Peoria, Ill.

[21] Appl. No.: 323,527

[22] Filed: Oct. 14, 1994

[51] Int. Cl.⁶ .................................................... F16H 61/12
[52] U.S. Cl. ................................................ 74/335; 477/906
[58] Field of Search ............................... 477/906; 74/335

[56] References Cited

U.S. PATENT DOCUMENTS

| | | | |
|---|---|---|---|
| 4,414,863 | 11/1983 | Heino | 74/866 |
| 4,724,939 | 2/1988 | Lockhart et al. | 192/3.3 |
| 4,875,391 | 10/1989 | Leising et al. | 74/866 |
| 4,918,606 | 4/1990 | Ito et al. | 364/414.1 |
| 4,953,679 | 9/1990 | Okino | 192/0.096 |
| 4,955,255 | 9/1990 | Yamaashi et al. | 74/856 |
| 4,955,256 | 9/1990 | Kashihara et al. | 74/866 |
| 4,960,091 | 10/1990 | Aufmkolk | 123/399 |
| 4,975,845 | 12/1990 | Mehta | 364/424.1 |
| 4,981,052 | 1/1991 | Gierer | 477/906 |
| 5,005,680 | 4/1991 | Satoh et al. | 192/3.55 |
| 5,021,955 | 6/1991 | Ito et al. | 477/906 |
| 5,033,328 | 7/1991 | Shimanaka | 74/866 |
| 5,046,175 | 9/1991 | Lentz et al. | 364/424.1 |
| 5,067,374 | 11/1991 | Sakai et al. | 74/866 |
| 5,072,390 | 12/1991 | Lentz et al. | 364/414.1 |
| 5,090,269 | 2/1992 | Ohtsuka et al. | 74/861 |
| 5,103,692 | 4/1992 | Shimanaka et al. | 74/857 |
| 5,113,720 | 5/1992 | Asayama et al. | 74/866 |
| 5,157,607 | 10/1992 | Stainton et al. | 463/424.1 |
| 5,174,137 | 12/1992 | Kato et al. | 73/118.1 |
| 5,191,815 | 3/1993 | Kouta | 477/906 |
| 5,315,972 | 5/1994 | Judy et al. | 123/198 D |

FOREIGN PATENT DOCUMENTS 2084673  9/1981  United Kingdom.

OTHER PUBLICATIONS

Article entitled "Transmission Control System for Bulldozers" from Off-Highway Engineering/Apr. 1993 (pp. 23 through 29).

SAE Paper 861170 entitled "Digital Electronic Controls for Detroit Diesel Allison Heavy Hauling Transmissions" by Boyer dated Sep. 1986.

SAE Paper 880480 entitled "Borg-Warner Australia Model 85 Automatic Transmission" by Wilfinger & Thompson dated 1988.

SAE Paper 890530 entitled "Nissan Electronically Controlled Four Speed Auto. Transmission" by Shinohara, Minoi dated 1989.

SAE Paper 901557 entitled "A Transmission Control System for Const. Machinery" by Kusaka & Ohkura dated Sep. 1990.

SAE Paper 901592 entitled "Adaptive Electronic Tractor Shift Control System" by Ross & Panoushek dated Sep. 1990.

U.S. Application 08/021,439 filed Feb. 24, 1993 entitled "Drivetrain Sensor and Diagnostic System" (Inventor: Birchenough et al).

*Primary Examiner*—Dirk Wright
*Attorney, Agent, or Firm*—Steven R. Janda

[57] ABSTRACT

A diagnostic system is provided for responding to a fault condition in a transmission having an electronic control including diagnostics for both electrical and mechanical failures, said diagnostics indicating the affected clutch and the type of failure. The diagnostic system includes a processor for selecting a first table of available gears in response to the affected clutch and a first subset of electrical and mechanical failure types being diagnosed and for selecting a second table of available gears in response to the affected clutch and a second subset of electrical and mechanical failure types being diagnosed.

19 Claims, 9 Drawing Sheets

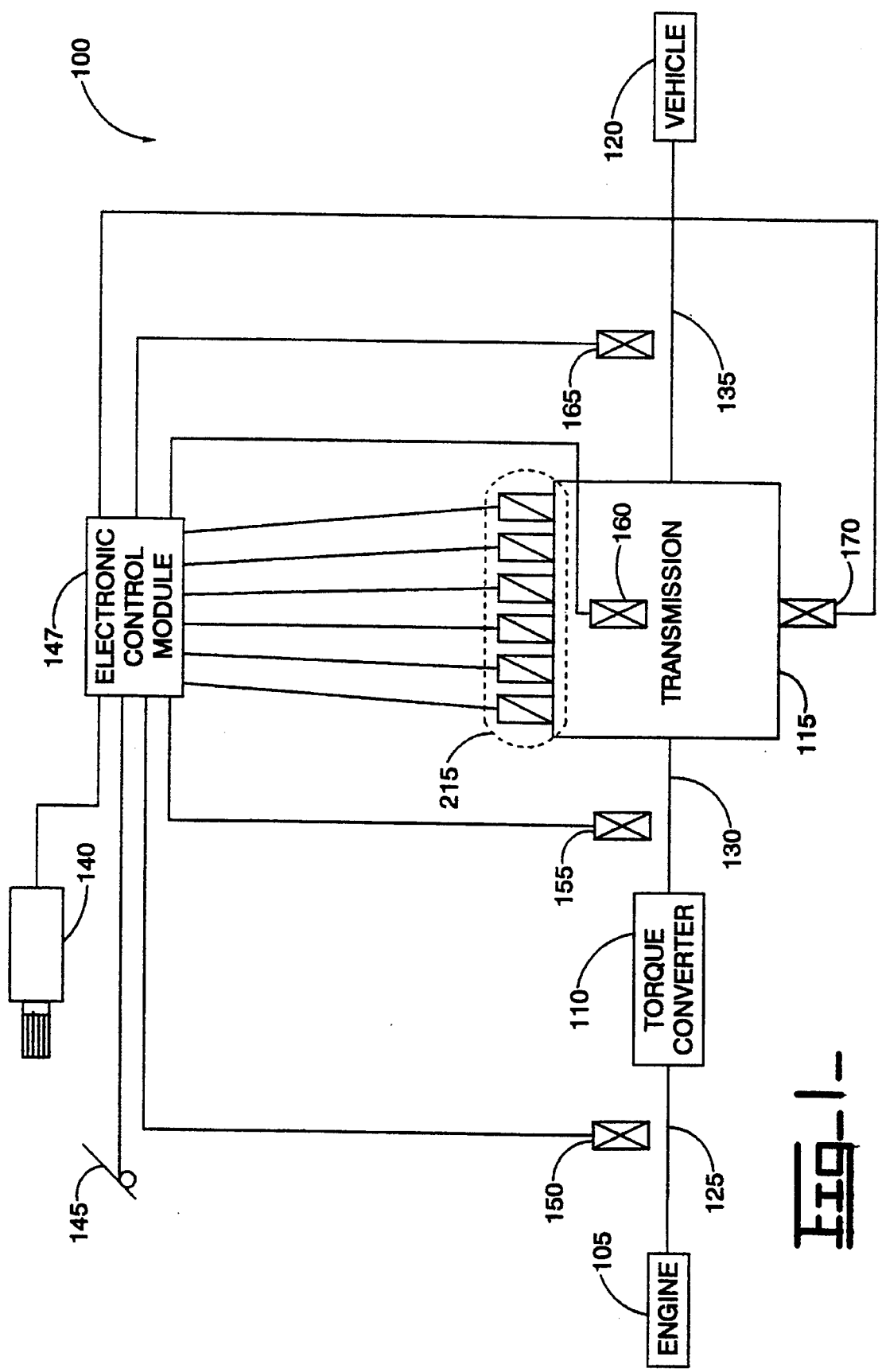

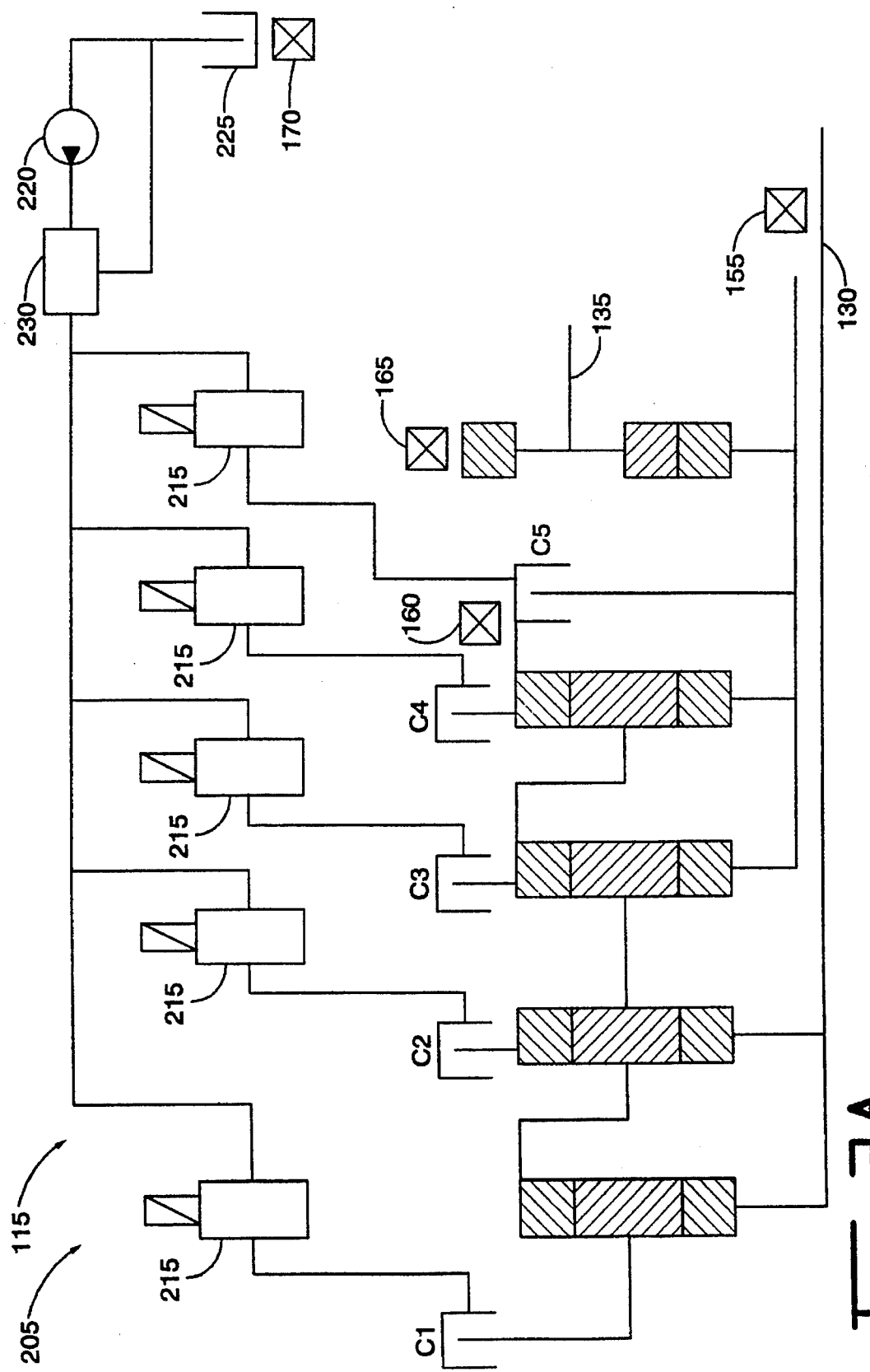
Fig-2A-

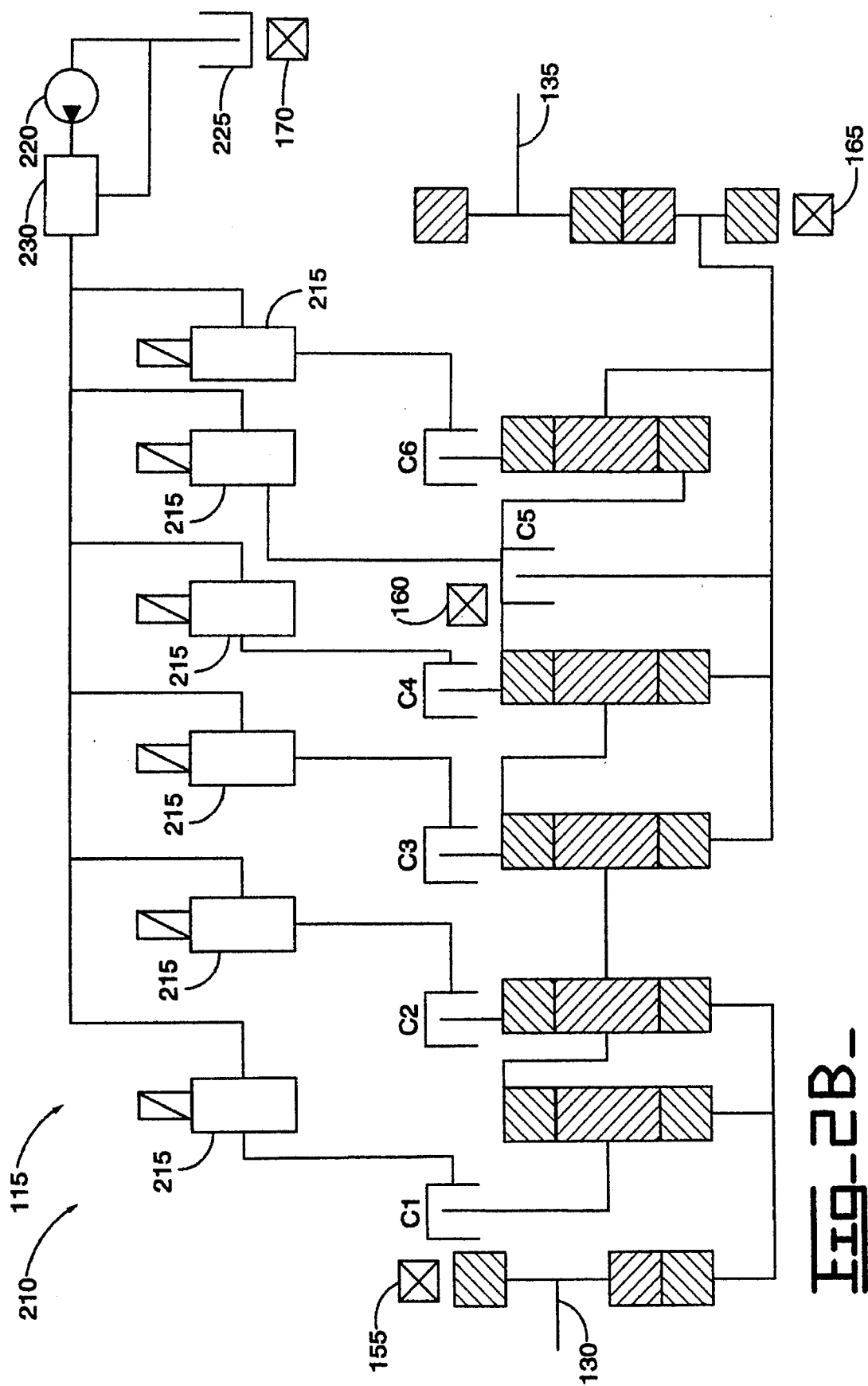
Fig_2B

Fig_4A_

NORMAL SHIFTING:

|  | 1ST | 2ND | 3RD | 4TH |
|---|---|---|---|---|
| FORWARD | 1F | 2F | 3F | 4F |
| NEUTRAL | NTRL | NTRL | NTRL | NTRL |
| REVERSE | 1R | 2R | 3R | 4R |
| NEUTRALIZE | 1 NTRLZ | 2 NTRLZ | 3 NTRLZ | 4 NTRLZ |

Fig_4B_

CLUTCH 1 (REVERSE) WON'T RELEASE:

|  | 1ST | 2ND | 3RD | 4TH |
|---|---|---|---|---|
| FORWARD | NCN | NCN | NCN | NCN |
| NEUTRAL | NCN | NCN | NCN | NCN |
| REVERSE | 1R | 2R | 3R | 4R |
| NEUTRALIZE | NCN | NCN | NCN | NCN |

Fig_4C_

CLUTCH 3 (4TH) WON'T RELEASE:

|  | 1ST | 2ND | 3RD | 4TH |
|---|---|---|---|---|
| FORWARD | NCN | NCN | NCN | 4F |
| NEUTRAL | NCN | NCN | NCN | NTRL |
| REVERSE | NCN | NCN | NCN | 4R |
| NEUTRALIZE | NCN | NCN | NCN | 4 NTRLZ |

Fig_4D_

CLUTCH 1 (REVERSE) WON'T ENGAGE

|  | 1ST | 2ND | 3RD | 4TH |
|---|---|---|---|---|
| FORWARD | 1F | 2F | 3F | 4F |
| NEUTRAL | NTRL | NTRL | NTRL | NTRL |
| REVERSE | NCN | NCN | NCN | NCN |
| NEUTRALIZE | 1 NTRLZ | 2 NTRLZ | 3 NTRLZ | 4 NTRLZ |

Fig_4E_

CLUTCH 4 (3RD) WON'T ENGAGE

|  | 1ST | 2ND | 3RD | 4TH |
|---|---|---|---|---|
| FORWARD | 1F | 2F | NCN | 4F |
| NEUTRAL | NTRL | NTRL | NTRL | NTRL |
| REVERSE | 1R | 2R | NCN | 4R |
| NEUTRALIZE | 1 NTRLZ | 2 NTRLZ | 3 NTRLZ | 4 NTRLZ |

Fig_3_
| | |
|---|---|
| -4R | XX |
| -3R | XX |
| -2R | XX |
| -1R | XX |
| 0 | XX |
| 1R | XX |
| 2R | XX |
| 3R | XX |
| 4R | XX |
Fig_5_
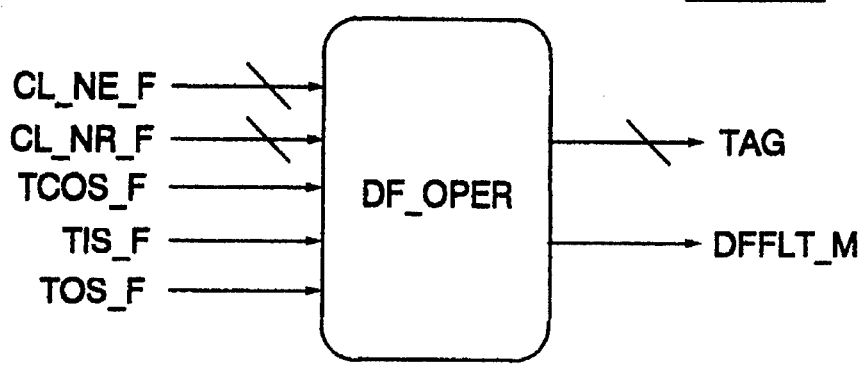
Fig_6_
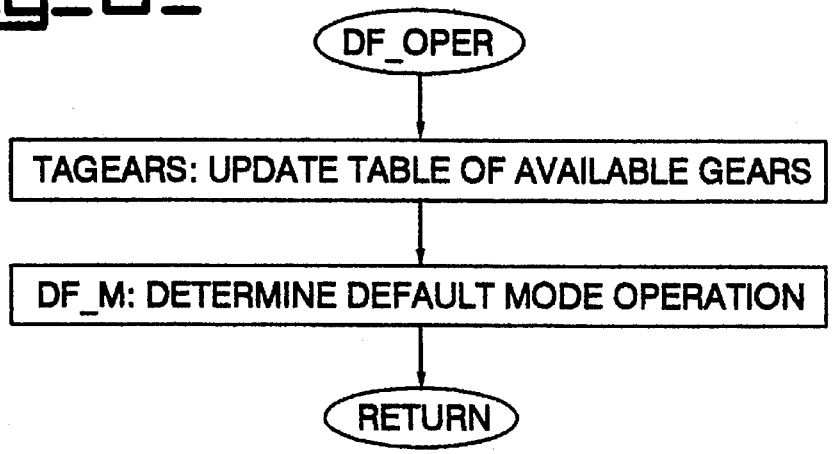

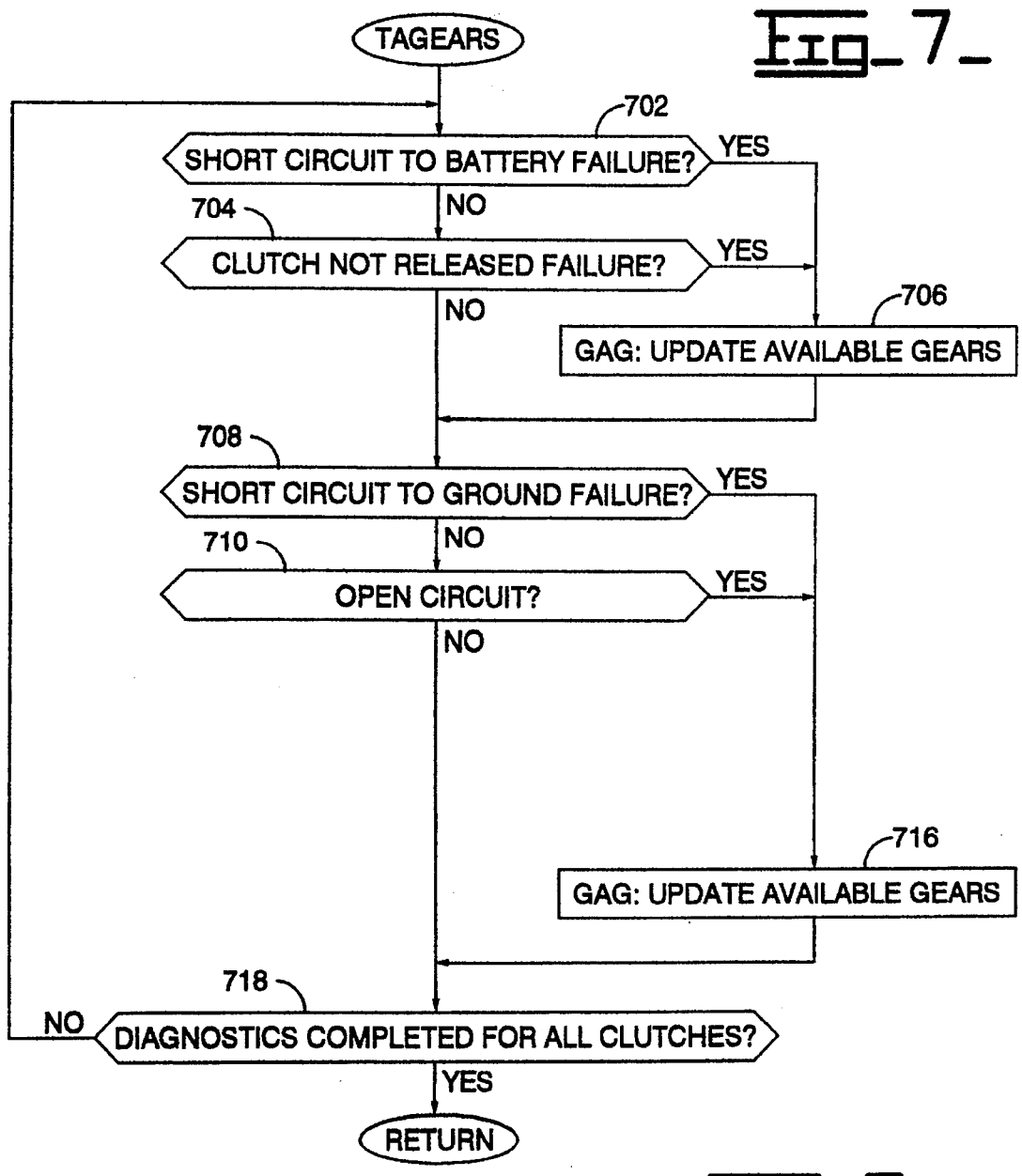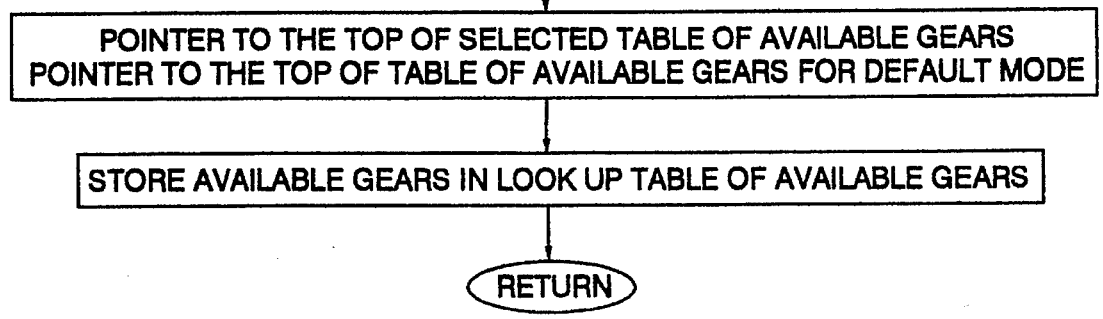

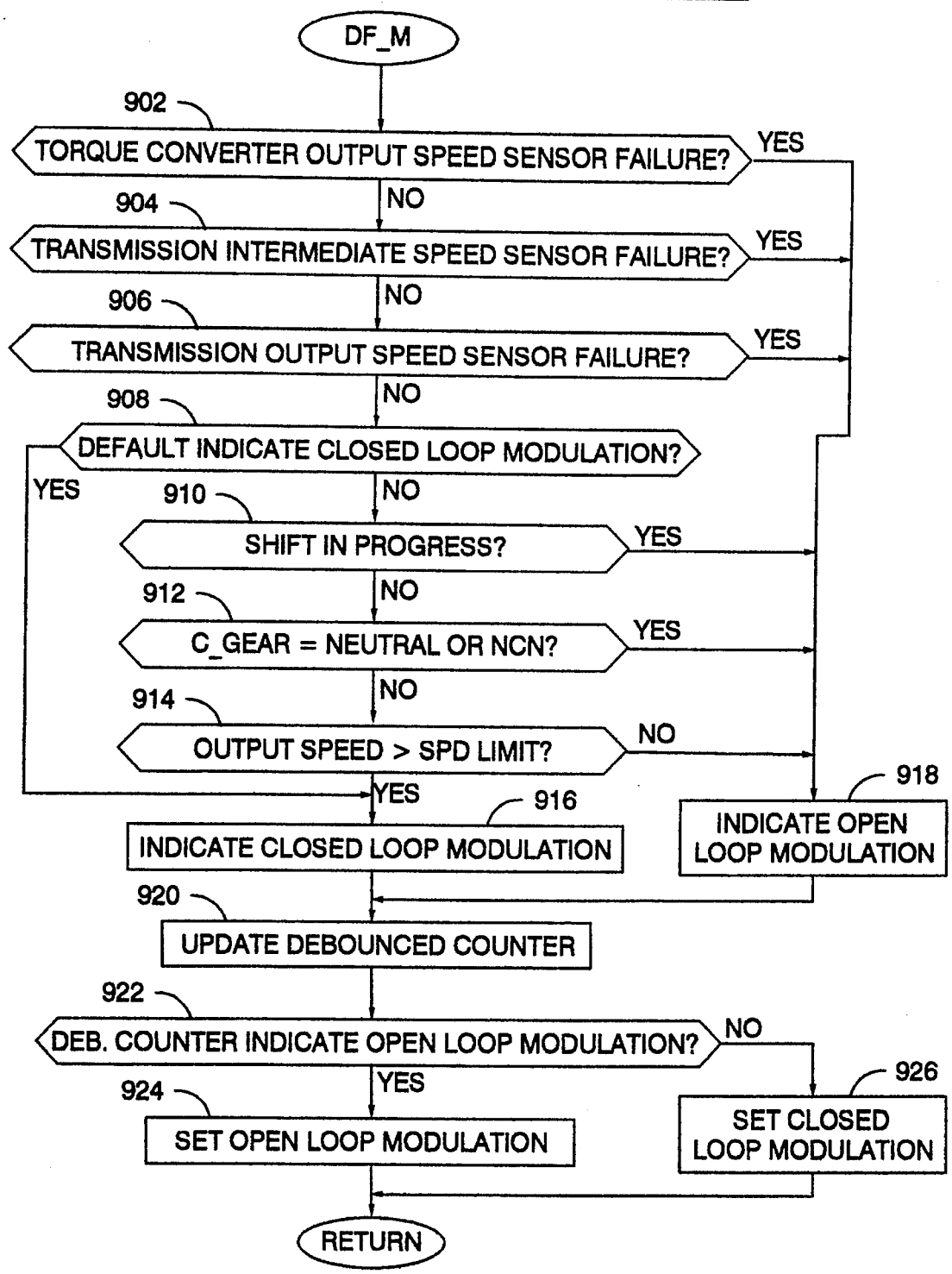
Fig_9_

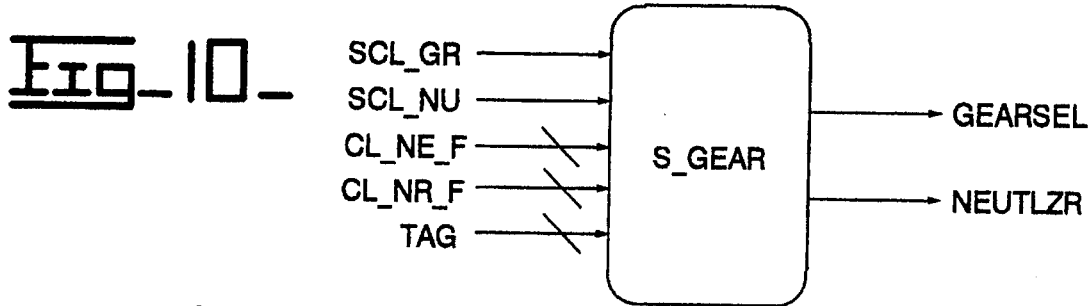
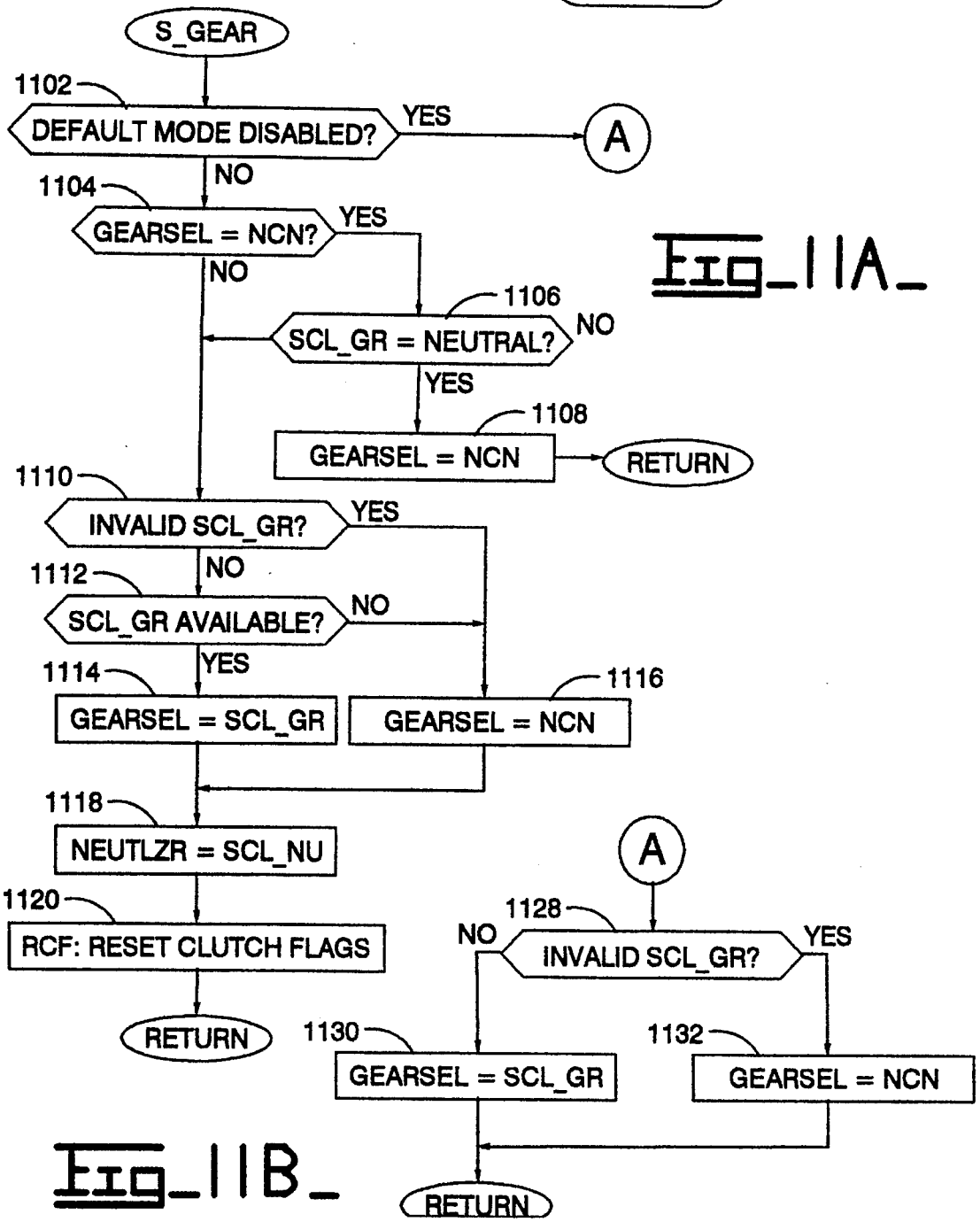

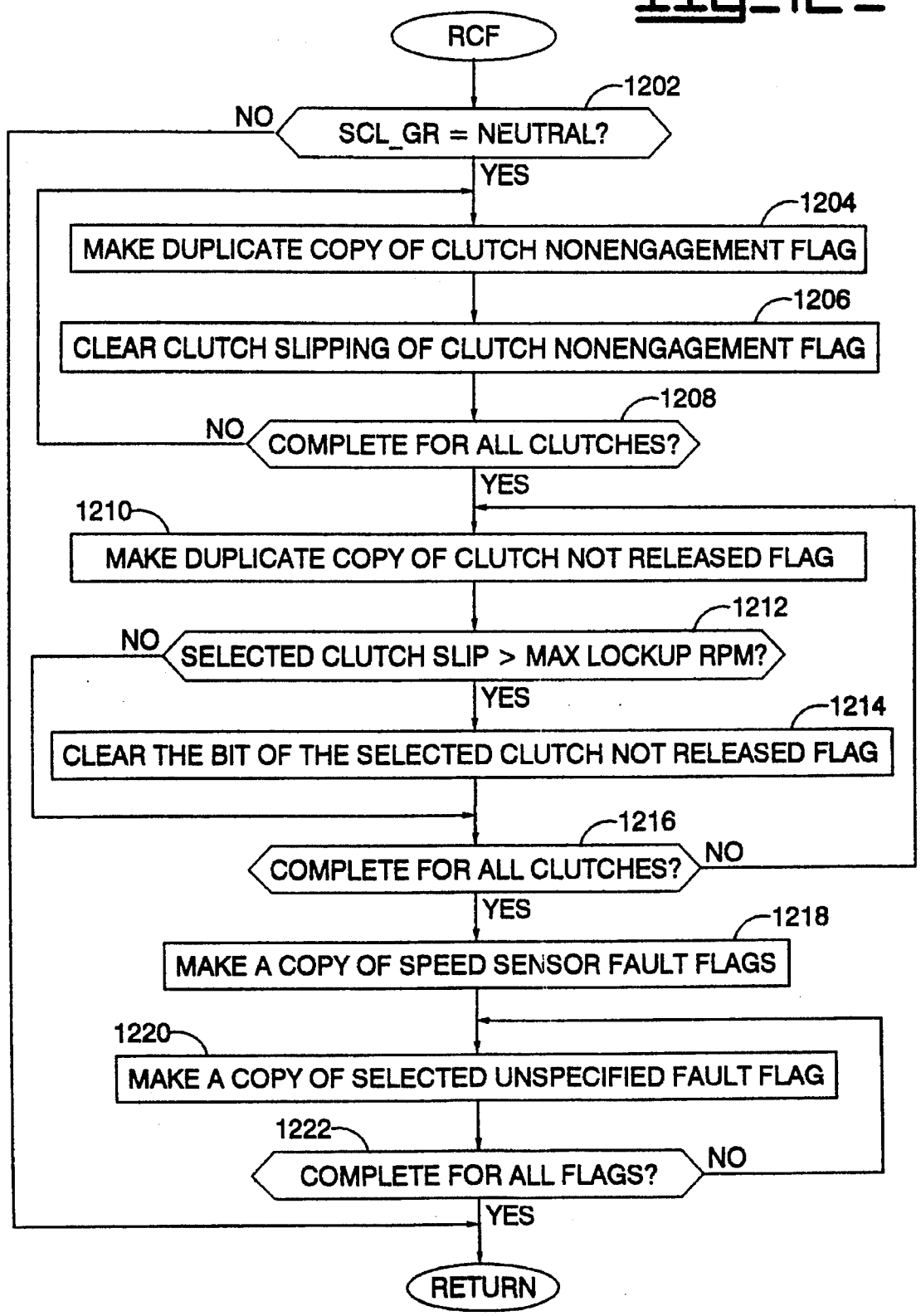
Fig_12_

5,493,928

TRANSMISSION CONTROL DEFAULT OPERATION

TECHNICAL FIELD

This invention relates generally to a powershift transmission diagnostic system and, more particularly, to a method and apparatus for altering operation of the powershift transmission in response to fault conditions.

BACKGROUND ART

Generally, a motor vehicle powershift transmission includes a number of gear elements coupling the input and output shafts, and a related number of clutches which are selectively engageable to activate gear elements for establishing a desired speed ratio between the input and output shafts. The clutch may be of the band or disk type.

For example, the input shaft may be connected to the engine through a fluid coupling, such as a torque converter, and the output shaft is connected directly to the vehicle drive. Shifting from one gear ratio to another involves releasing or disengaging the off-going clutches associated with the current gear ratio and applying or engaging the on-coming clutches associated with the desired gear ratio.

Transmissions of this type are often electronically controlled and include diagnostic functions for determining when a fault condition exists. For example, diagnostic systems can sense electrical problems with the control solenoids. A system of this type is illustrated in U.S. Pat. No. 4,414,863 issued Nov. 15, 1983 to Heino. Diagnostic systems have also been developed which place a transmission control into one of two states depending on the type of fault condition detected. Such a system is described in an SAE Technical Paper entitled "Adaptive Electronic Tractor Shift Control System" dated Sep. 10–13, 1990 by Larry F. Ross and Dale W. Panoushek. In one state, a speed shift change from the current state is not allowed. In this case, either a shifter signal or clutch pedal switch signal was determined to be invalid, and the controller keeps the transmission in the last speed prior to the invalid condition. In the second state, the transmission control disengages all clutches. In this case, the controller detected an invalid condition in either a solenoid circuit or a clutch pressure signal. The control module deenergizes all speed solenoids in order to avoid simultaneous clutch engagement due to ambiguous input states.

Such a system does not fully address the need to maintain transmission operation when possible, but if necessary, prevent a shift into a gear not requested by the operator and prevent clutch tie-up. Further, the prior art system does not fully address the need to associate groupings of electrical and mechanical failure types with the appropriate set of available gears to maintain transmission operation when possible.

The present invention is directed to overcoming one or more of the problems as set forth above.

DISCLOSURE OF THE INVENTION

Based on a diagnosed fault, the invention determines whether the operator is allowed to shift to the desired gear by associating groups of electrical and mechanical failures with sets of available gears. If a selected gear is not available, then the desired gear is set to no clutch neutral (NCN), prior to any subsequent shifts.

In one aspect of the present invention, a diagnostic system is provided for responding to a fault condition in a transmission having an electronic control including diagnostics for both electrical and mechanical failures. The diagnostic system includes a processor for selecting a first table of available gears in response to the affected clutch and a first subset of failure types being diagnosed and for selecting a second table of available gears in response to the affected clutch and a second subset of failure types being diagnosed.

In a second aspect of the invention, a method is provided for responding to a fault condition in a transmission having an electronic control including diagnostics for both electrical and mechanical failures. The method includes the steps of selecting a first table of available gears in response to the affected clutch and a first subset of failure types being diagnosed and selecting a second table of available gears in response to the affected clutch and a second subset of failure types being diagnosed.

BRIEF DESCRIPTION OF THE DRAWINGS

For a better understanding of the present invention, reference may be made to the accompanying drawings in which:

FIG. 1 is a block diagram of an electronic control system of a vehicle drive train including a transmission;

FIGS. 2A and 2B are block diagrams illustrating respective embodiments of a transmission configuration;

FIG. 3 illustrates a table of available gears;

FIGS. 4a through 4e illustrate examples of gears that are available in a plurality of transmission states; and FIGS. 5 through 12 illustrate algorithms executed in connection with an embodiment of the invention.

BEST MODE FOR CARRYING OUT THE INVENTION

Referring now to the drawings, FIG. 1 illustrates an electronic control system of a power train 100 that includes an internal combustion engine 105, a fluidic torque converter 110, a multi-speed fluid operated power transmission 115, and a vehicle drive train 120. The engine 105 is connected to the torque converter 110 via shaft 125, the torque converter 110 is connected to the transmission 115 via shaft 130, and transmission 115 is connected to the vehicle drive 120 via shaft 135.

Referring now to FIGS. 2A and 2B, a block diagram of two transmission gear sets are shown. For example, FIG. 2A represents a track-type tractor transmission gear set 205, and FIG. 2B represents a wheeled vehicle transmission gear set 210. The transmission of FIG. 2A includes five clutches, where C1 is a reverse direction clutch, C2 is a forward direction clutch and clutches C3–C5 are speed clutches. The transmission of FIG. 2B includes six clutches, where C1 is a reverse direction clutch, C2 is a forward direction clutch and clutches C3–C6 are speed clutches. Gear shifts are accomplished by selectively engaging and disengaging combinations of the clutches. The clutches are actuated by hydraulic pressure and upon engagement, require fill time before torque is transmitted between a driving and a driven friction element. That is, the fill time is the elapsed time that the clutch piston moves from the released to the engaged position. The clutches are selectively engaged and disengaged by solenoid operated proportional pressure control valves 215. The hydraulic circuit of the transmission includes a positive displacement pump 220 that supplies pressurized hydraulic fluid from the sump or reservoir 225 to the clutches through the control valves 215. Moreover, a relief valve 230 may be added to regulate the valve supply pressure.

Referring back to FIG. 1, the control portion of the power train will now be discussed. An operator initiates a desired shift via an operator shift handle 140, which produces a gear selection signal. An electronic control module 147 receives the gear selection signal and responsively controls the operation of the solenoid control valves 215. The electronic control module 147 may also receive various other input signals representative of vehicle system parameters. Such other input signals may include a neutralizing signal from a neutralizer pedal 145, an engine speed signal from an engine speed sensor 150, an transmission input speed signal, $T_I$, from a transmission input speed sensor 155, a transmission intermediate speed signal, $T_N$, from a transmission intermediate speed sensor 160, a transmission output speed signal, $T_O$, from a transmission output speed sensor 165, and a transmission oil temperature signal from a transmission oil temperature sensor 170. The sensors are conventional electrical transducers such as potentiometers, thermistors and/or magnetic speed pickups.

Internally, the electronic control module 147 comprises a number of conventional devices including a microprocessor with an internal clock and memory, an input/output device, and an array of proportional solenoid current drivers. One solenoid driver is dedicated to each solenoid control valve 215. The microprocessor delivers a command signal proportional to the desired solenoid current, and the current driver uses a Pulse Width Modulated voltage to produce the desired current. The solenoid control valves 215 are configured to maintain a flow of oil to the clutch sufficient to maintain a clutch pressure proportional to the solenoid current. Thus, the microprocessor controls the clutch pressure proportional to the command signal delivered to the solenoid driver circuit. Proportional solenoid current drivers are well known in the art, and need not be further discussed.

The microprocessor utilizes arithmetic units to control the transmission shifting in accordance with software programs. Typically, the programs are stored in read-only memory, random-access memory or the like.

FIG. 3 illustrates a table of available gears (TAG). A default operation routine updates the table of available gears based on the flags being set to indicate clutch problems by a diagnostic system. One such diagnostic system is disclosed in a patent application filed simultaneously herewith entitled "Transmission Control Fault Detection" (Attorney Docket No. 94-352) and is incorporated herein by reference in its entirety. Also based on the fault diagnosis, the default operation routine sets the flag for the type of modulation to be adapted for upcoming shifts.

In the table of available gears shown in FIG. 3, three forward and three reverse gears are included and the availability of each gear is determined by a corresponding binary value, XX. For each gear, including neutral, if the binary value XX is "00" then that gear is available, but if the binary data XX is "FF" then that particular gear is unavailable. If a requested gear is unavailable, a no clutch neutral state is selected in which the transmission control urges the respective clutches toward a disengaged position.

FIGS. 4a–4e illustrate the table of available gears for some exemplary transmission states. FIG. 4a illustrates the normal operation case when all of the possible gears of the transmission are available. In the neutralize case, the direction clutch is disengaged but the speed clutch is engaged. In the neutral case, the direction clutch is disengaged, but a high gear speed clutch is engaged. In FIG. 4b, the reverse clutch will not release, so only reverse gears are available and all other selected gears cause the transmission to be in a no clutch neutral state. In FIG. 4c, clutch number 3 or the fourth gear speed clutch will not release. In this case, the gears involving the fourth gear speed clutch are all available, but the other gears are unavailable. In FIG. 4d, the reverse clutch will not engage due to an electrical fault. In this case, if one of the reverse gears are selected, the transmission is shifted to no clutch neutral; otherwise the selected gears are available. In FIG. 4e, the third gear speed clutch will not engage due to an electrical fault. In this case, if third gear forward or reverse is selected, the transmission is shifted to no clutch neutral; otherwise the selected gears are available.

In FIG. 5, the inputs and outputs for the default operation routine are shown. The inputs include flags set by an appropriate transmission diagnostic system. The flags indicate clutch nonengagement failures for each clutch, clutch not release failures for each clutch, and failures of the torque converter output speed sensor and the transmission intermediate and output speed sensors. In addition to the illustrated inputs, solenoid electrical fault flags (not shown) are delivered from a solenoid diagnostic system (not shown). Inputs include flags for each clutch control solenoid indicating short circuit to ground, open circuit, and short circuit to battery flags for each of the solenoid actuators. FIG. 6 illustrates the major subroutines of the default operation routine.

The algorithm used to update the table of available gears is illustrated in FIG. 7. If a short circuit to battery flag or the clutch not released flag is set, then a table of available gears is retrieved at block 706. In the preferred embodiment, if either of these two failures are present, then a table similar to those illustrated in FIGS. 4b and 4c is retrieved but with available gears corresponding to the affected clutch. This grouping is selected because a short circuit to battery in a control solenoid prevents the corresponding clutch from releasing.

If a short circuit to ground flag or open circuit flag is set, then a table of available gears is retrieved at block 716. In the preferred embodiment, if any of these failures are present, then a table similar to those illustrated in FIGS. 4d and 4e are retrieved but with available gears corresponding to the affected clutch. This grouping is selected because any of the electrical solenoid failures of blocks 708 and 710 prevent the corresponding clutch from engaging.

FIG. 8 illustrates in more detail the function of getting the table of available gears that is appropriate for a given type of failure associated with a particular clutch. In this routine, the table of available gears is updated based on the selected table of available gears corresponding to the electrical and mechanical faults. The pointer for the table of available gears is positioned at the top of the table of available gears for the clutch and fault-type corresponding to the fault condition in the default mode. The selected table of available gears is stored in a look-up table of available gears for use by the transmission control.

Turning now to FIG. 9, an algorithm for determining whether open loop or closed loop modulation of the clutches should be used. If any of the torque converter output, transmission intermediate, or transmission output speed sensors has experienced a failure, then open loop modulation is set at block 918. If none of the three speed sensors are in a failure state, then open loop modulation is set if a default flag indicating closed-loop modulation is not set and one or more of the following conditions is met: a shift is in progress; the current gear is neutral or no clutch neutral; and the output speed is not greater than a predefined constant. Otherwise, closed loop modulation is set. The state of the flag indicating open or closed loop modulation is then debounced in blocks 920 through 926.

A routine is illustrated in FIGS. 10 and 11 for checking whether the desired gear is available. If the desired gear is available, then the transmission is allowed to shift to the desired gear; otherwise the transmission shifts to no clutch neutral. The inputs for this routine, shown in FIG. 10, include the desired gear and neutralizer input, a default enable/disable flag, the clutch nonengagement flags, the clutch not released flags, and the table of available gears. The outputs for the routine include the gear to be shifted to by the transmission and the neutralizer flag.

If the default mode is found to be not enabled in block 1102, then control passes to block 1128 in FIG. 11b wherein if the signal indicating the desired gear based on operator input is outside the set of valid gears, i.e. the signal is not one defined to correspond to any of the transmission gears or states, then the selected gear output sent to the transmission control is no clutch neutral; otherwise the gear selected by this routine and output to the transmission control is set equal to the desired gear.

If the default mode is enabled, then if the current gear selected is no clutch neutral, control passes to block 1106. If the desired gear from the operator input corresponds to a no clutch neutral gear, then the gear selected by this routine is maintained at no clutch neutral. If the desired gear from the operator input does not correspond to a no clutch neutral gear or the current gear selected is not no clutch neutral, then control passes to block 1110.

If the desired gear from the operator input is either not a valid gear, i.e. the signal is not one defined to correspond to any of the transmission gears or states, or shown as being not available from the table of available gears, then the selected gear to be delivered to the transmission control is set to no clutch neutral and the desired gear is set to correspond to a no clutch neutral gear, otherwise the selected gear is set equal to the desired gear. The neutralizer output is set equal to the neutralizer input produced in response to operator input at block 1118 and the clutch flags are reset at block 1120.

If the desired gear is not neutral, then a copy of the clutch nonengagement flag is made at block 1204 for diagnostic purposes and the clutch slipping bit of the clutch nonengagement flag is cleared at block 1206 for each of the clutches. Duplicate copies of the clutch not released flags are set at block 1210 and the appropriate bit of the selected clutch not released flag is cleared at block 1214 if selected clutch slip is greater than maximum lockup speed. This is repeated for each clutch. Copies of sensor fault flags are made at block 1218 and a copy of each unspecified fault flag is made at blocks 1220 and 1222.

Industrial Applicability

Based on diagnosed transmission faults, the present invention determines the table of available gears for the operator to choose in operating a transmission. In response to input from the operator, the system determines that a shift to a particular gear is desired. The system looks into the table of available gears to check the availability of the selected gear. If the operator selected shift is available, then the operator is allowed to go into the desired gear; otherwise the shift is to no clutch neutral. If the shift is not allowed the operator must move the gear selector such that an available gear is requested before shifting to another gear.

Other aspects, objects, and advantages of the present invention can be obtained from a study of the drawings, the disclosure, and the appended claims.

We claim:

1. An apparatus for responding to a fault condition in a transmission having an electronic control including diagnostics for both electrical and mechanical failures, said diagnostics indicating the affected clutch and the type of failure, comprising:

means for selecting a first group of available gears in response to the affected clutch and a first subset of failure types being diagnosed;

means for selecting a second group of available gears in response to the affected clutch and a second subset of failure types being diagnosed; and means for providing one of said first and second groups of available gears for control of the transmission.

2. An apparatus, as set forth in claim 1, wherein said first subset of failure types includes clutch failure to release and solenoid short circuit to battery.

3. An apparatus, as set forth in claim 1, wherein said second subset of failure types includes solenoid open circuit and solenoid short circuit to ground.

4. An apparatus, as set forth in claim 1, wherein said first group of available gears includes transmission states in which the affected clutch is engaged.

5. An apparatus, as set forth in claim 4, wherein said first group of available gears includes a no clutch neutral state corresponding to each transmission state in which the affected clutch is to be disengaged.

6. An apparatus, as set forth in claim 1, wherein said second group of available gears includes available transmission states wherein the affected gear is to be disengaged.

7. An apparatus, as set forth in claim 6, wherein said second group of available gears includes a no clutch neutral state corresponding to each transmission state in which the affected clutch is to be engaged.

8. An apparatus for responding to a fault condition in a transmission having an electronic control including diagnostics for both electrical and mechanical failures, said diagnostics indicating the affected clutch and the type of failure, comprising:

means for receiving one or more diagnostic signals and a selected gear signal;

means for determining whether the selected gear is available in response to said one or more diagnostic signals;

means for maintaining operation of said transmission in response to the selected gear being available; and means for deactivating all clutch control solenoids in response to the selected gear being unavailable.

9. An apparatus, as set forth in claim 8, including:

means for selecting a first group of available gears in response to the affected clutch and a first subset of failure types being diagnosed; and means for selecting a second group of available gears in response to the affected clutch and a second subset failure types being diagnosed.

10. A method for responding to a fault condition in a transmission having an electronic control including diagnostics for both electrical and mechanical failures, said diagnostics indicating the affected clutch and the type of failure, comprising the steps of:

selecting a first group of available gears in response to the affected clutch and a first subset of failure types being diagnosed;

selecting a second group of available gears in response to the affected clutch and a second subset of failure types being diagnosed; and providing one of said first and second groups of available gears for control of the transmission.

11. A method, as set forth in claim 10, wherein said first subset of failure types includes clutch failure to release and solenoid short circuit to battery.

12. A method, as set forth in claim 10, wherein said second subset of failure types includes solenoid open circuit and solenoid short circuit to ground.

13. A method, as set forth in claim 10, wherein said first group of available gears includes transmission states in which the affected clutch is engaged.

14. A method, as set forth in claim 13, wherein said first group of available gears includes a no clutch neutral state corresponding to each transmission state in which the affected clutch is to be disengaged.

15. A method, as set forth in claim 10, wherein said second group of available gears includes transmission states in which the affected gear is disengaged.

16. A method, as set forth in claim 15, wherein said second group of available gears includes a no clutch neutral state corresponding to each transmission state in which the affected clutch is to be engaged.

17. A method, as set forth in claim 10, including the step of requiring an operator to select neutral prior to shifting from an unavailable gear to an available gear.

18. A method for responding to a fault condition in a transmission having an electronic control including diagnostics for both electrical and mechanical failures, said diagnostics indicating the affected clutch and the type of failure, comprising the steps of:

receiving one or more diagnostic signals and a selected gear signal;

determining whether the selected gear is available in response to said one or more diagnostic signals;

maintaining operation of said transmission in response to the selected gear being available; and deactivating all clutch control solenoids in response to the selected gear being unavailable.

19. A method, as set forth in claim 18, including the steps of:

selecting a first group of available gears in response to the affected clutch and a first subset of failure types being diagnosed; and selecting a second group of available gears in response to the affected clutch and a second subset of failure types being diagnosed.

* * * * *